Patented Jan. 9, 1923.

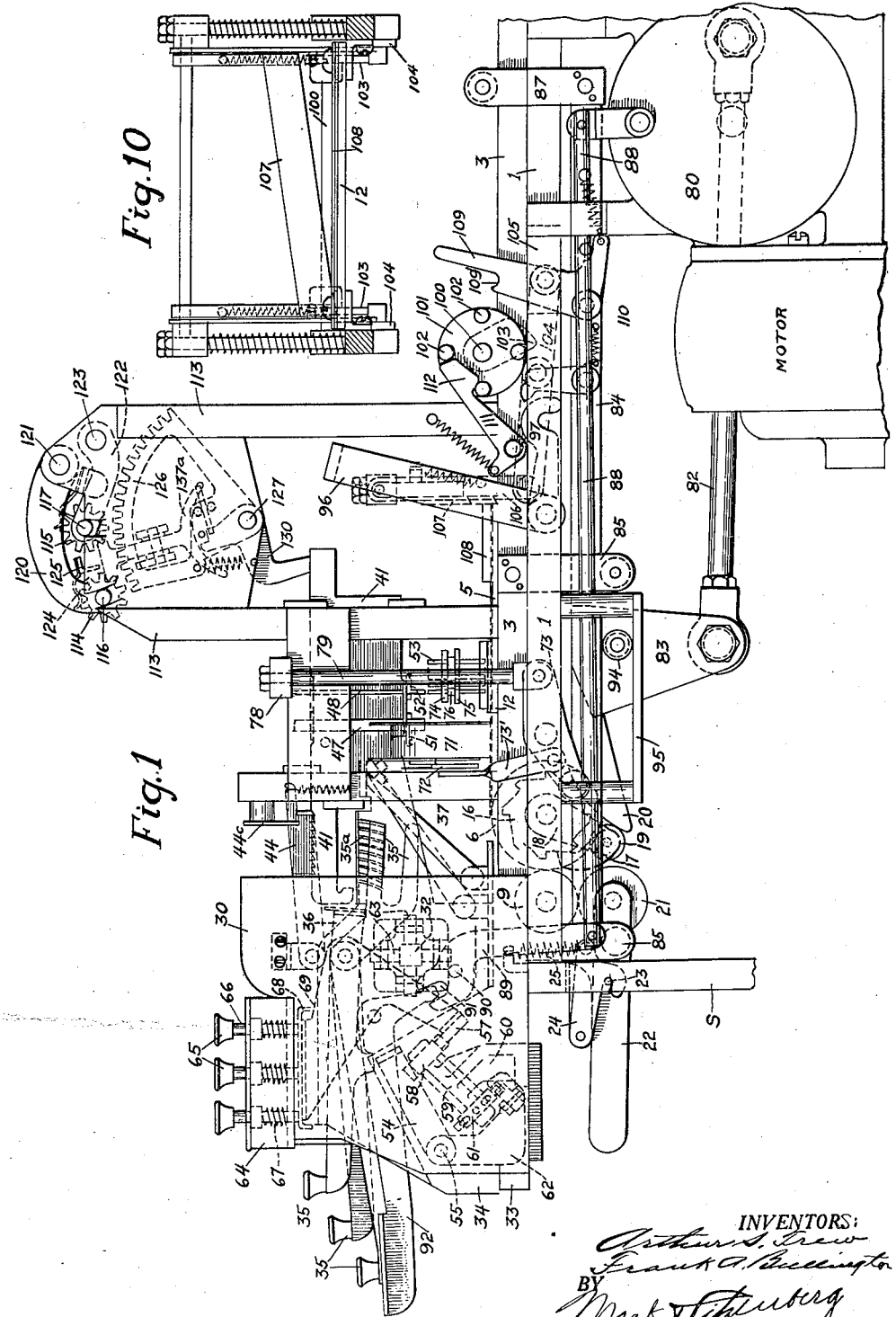

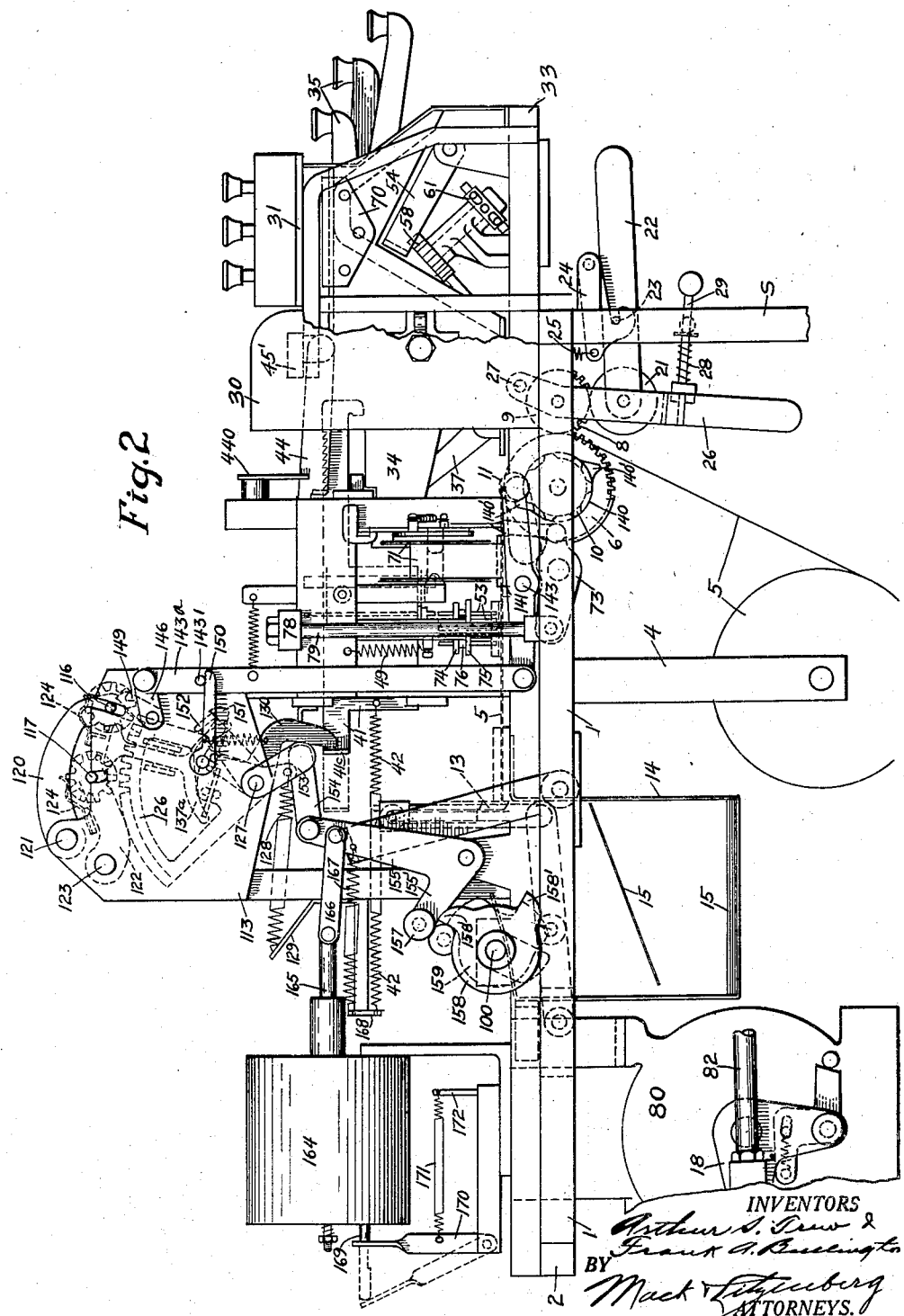

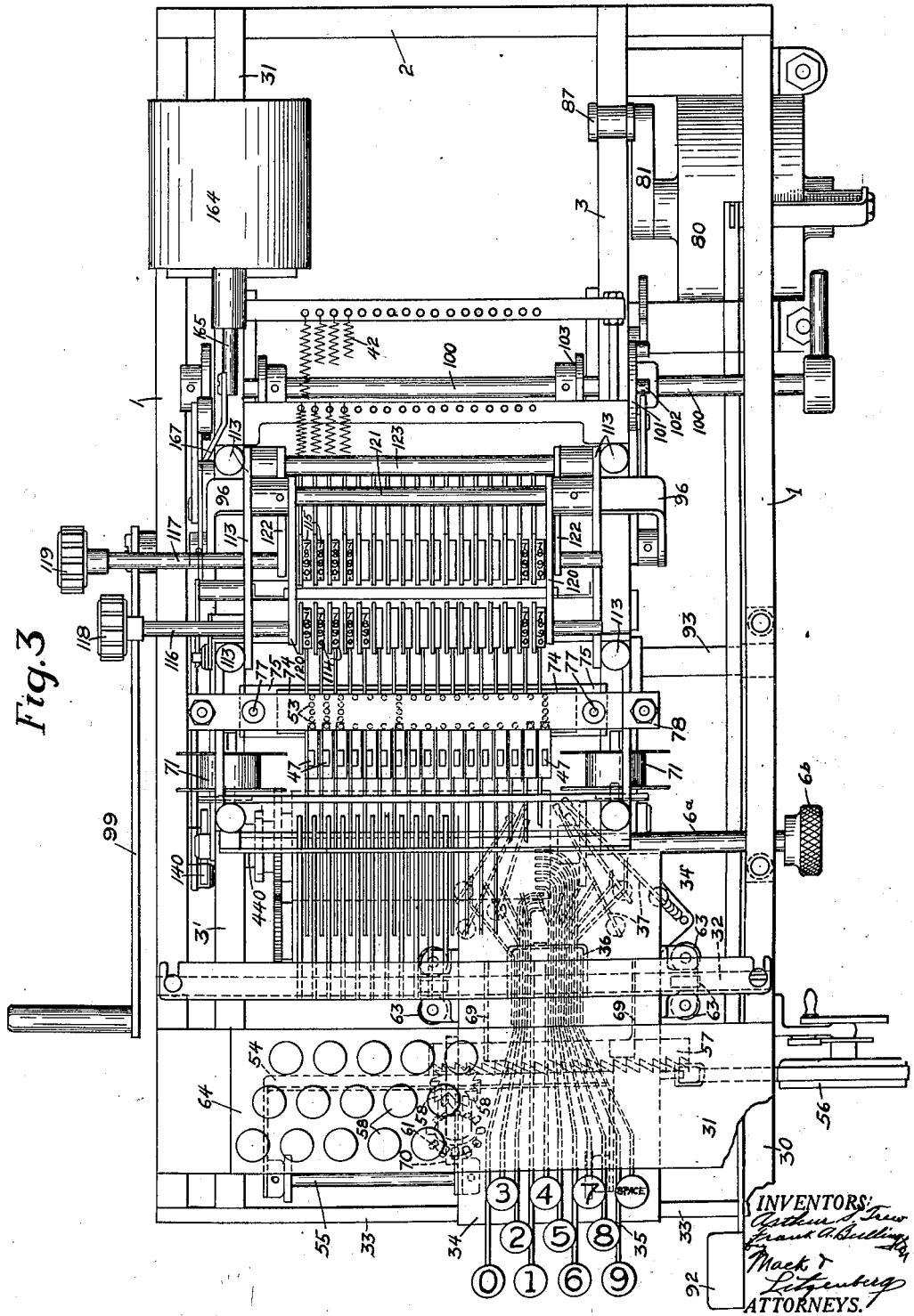

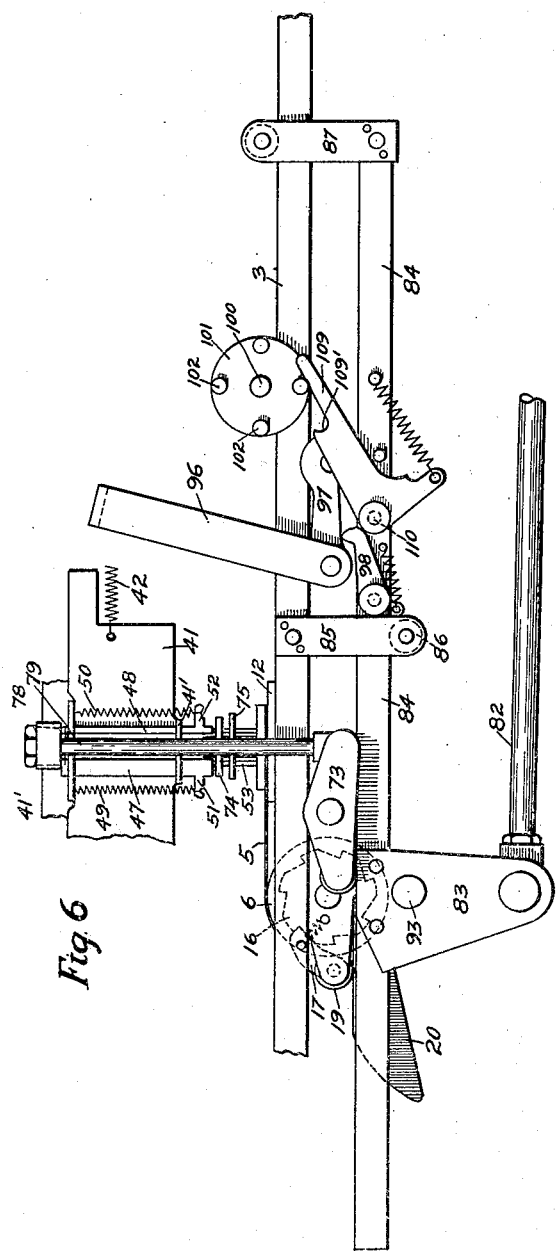
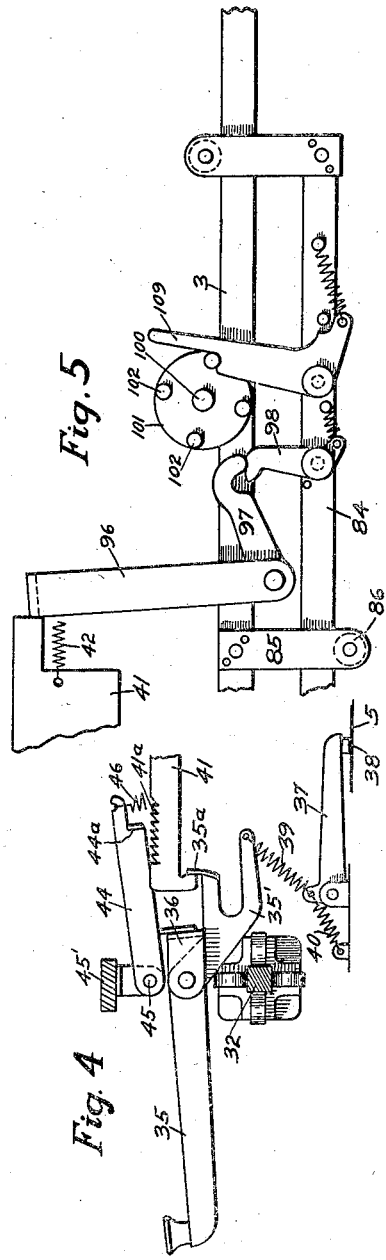

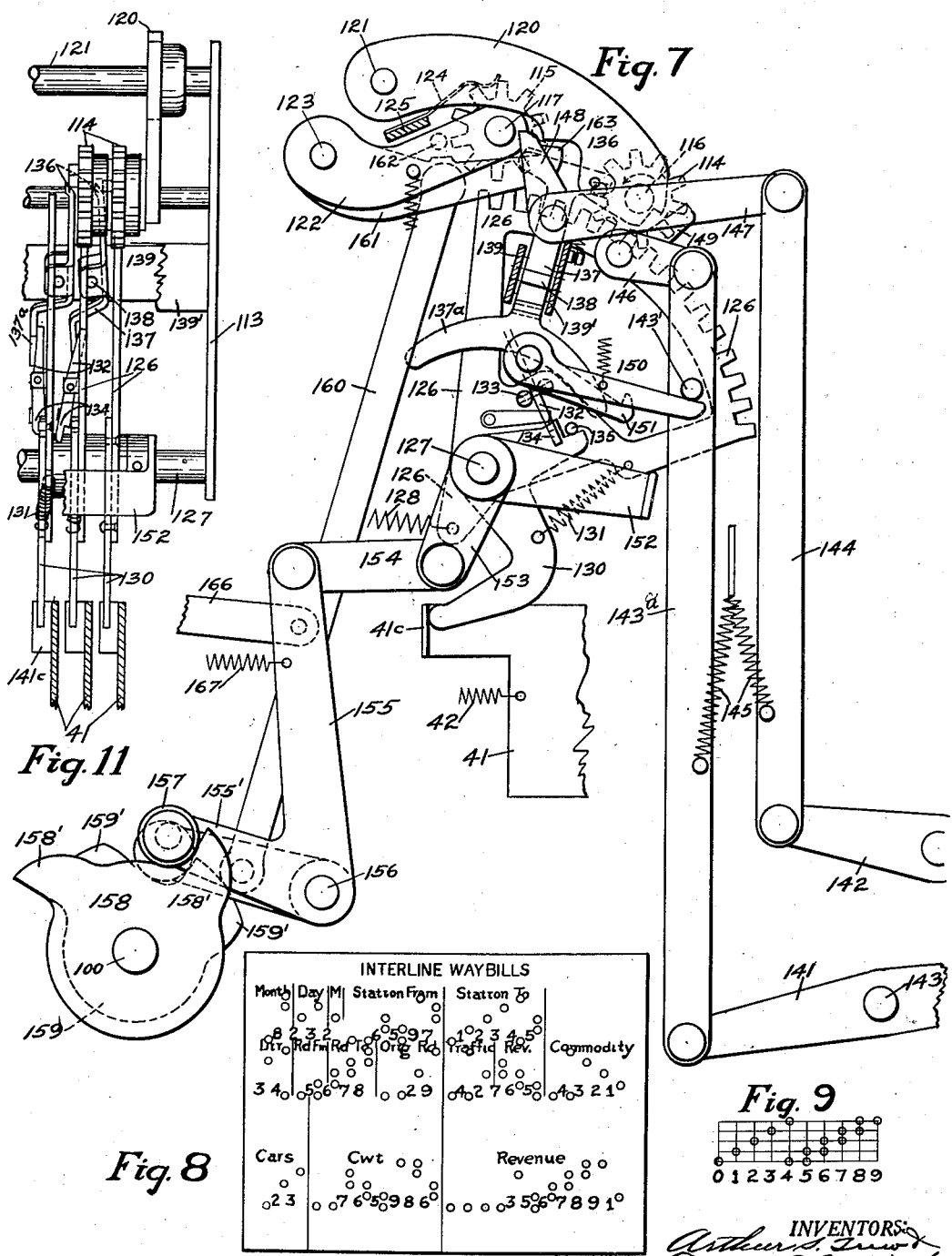

1,441,385

UNITED STATES PATENT OFFICE.

ARTHUR S. TREW AND FRANK A. BULLINGTON, OF PORTLAND, OREGON, ASSIGNORS TO TREW TABULATING MACHINE COMPANY, A CORPORATION OF OREGON.

CARD-MAKING MACHINE.

Application filed June 21, 1918. Serial No. 241,190.

*To all whom it may concern:*

Be it known that we, ARTHUR S. TREW and FRANK A. BULLINGTON, citizens of the United States, residing in the city of Portland, county of Multnomah, and State of Oregon, have invented certain new and useful Improvements in Card-Making Machines, of which the following is a specification.

Our invention relates to card making machines, and more particularly to a machine adapted for making cards on which certain data or information is indicated by record holes and also by print. Such a card is shown in the pending application of Arthur S. Trew, one of applicants herein, for automatic pneumatic card assorting machine, filed May 8, 1917, Serial No. 167,264.

The principal object of this invention is to provide a machine by means of which cards can be printed, punched and cut from a supply of card material by the simple manipulation of keys and co-operation mechanisms. We have also provided in combination therewith and as a part thereof, adding mechanism for totaling items listed under different headings printed on said cards as they are printed, punched and cut from the card material passing through the machine.

Another object of the invention is to provide a machine of the character referred to which is automatic in the performance of its function; that is, for example, by the manipulation of certain keys, as in the manipulation of the keys of an adding machine, and the pressing of a release or trip member, the machine automatically prints certain headings, also prints certain information under said headings, also indicates said information by record punches through said card material, under said headings, carries forward the totals of certain of the information so indicated by print and punch, and cuts and discharges said card from the machine. These cards are then assorted by the assorting machine.

In order to more fully explain our invention, we have illustrated one practical embodiment thereof on the accompanying sheets of drawings, which we will now describe.

Figure 1 is a side elevation thereof, from the right-hand side;

Figure 2 is a side elevation thereof, from the opposite side;

Figure 3 is a top plan view thereof;

Figure 4 is a detail view of one of the keys in depressed position, showing the released selector bar in stopped position, and also showing the down or printing position of one of the type bars;

Figure 5 is a detail view showing the opposite end of one of the selector bars, and the operating connections for restoring the selector bars to normal positions;

Figure 6 is a detail view showing an operating bar in its forward position, with cams for operating different mechanisms in connection with the feeding and punching of the card material;

Figure 7 is a side elevation of the mechanism which times and controls the adding or totaling mechanism;

Figure 8 is a view of one of the cards made by the machine;

Figure 9 is a key showing the different punches for indicating the numerals from 0 to 9;

Figure 10 is a view showing the knife and its connections for cutting the cards from the card material after they are printed and punched;

Figure 11 is a detail view of the tripping mechanism for the carry over connections between the counter wheels.

Referring first to Figs. 8 and 9, we will describe the card and the manner of indicating the desired information thereon. As the card material is advanced intermittently through the machine, a die prints the headings in the first horizontal row together with the division lines therebetween, as shown. The keys are manipulated for indicating the desired information under these headings: "Month: Day: M: Station from: Station to." The information under these headings is indicated both by the printed numeral and by the punches positioned to indicate the same numeral or number. For the 8th month, the 8 key is struck. This operates to print on the card, under the heading "Month" the numeral 8; and also to punch the two holes, positioned to indicate the numeral 8, according to the key, shown in Fig. 9. The arrangement used in this key is limited to five vertical positions for the holes to make up any combination of numbers from 1 to 9, as will be understood by reference to the key. The numerals are printed between the positions for the holes, so that the printed numeral and the holes will not interfere with each other. On the card, Fig. 8, the day indicated is the 23rd, which is printed and also indicated by the proper combination of holes. Under "Station from" is indicated the number 6597, printed and punched. Under this heading, according to the card shown, there are positions for six numerals, which accounts for two cipher punches at the left of the number 6597. All positions to the left of the number used, if said number does not have six numerals in it, are occupied by cipher punches.

Referring now to the drawings, our invention as here embodied for purposes of illustration is mounted upon a base frame, composed of the side members 1, 1, and the end members 2, 2, and two supporting members 3, 3'. The base frame may be supported on any suitable standard, whereby to be moved freely from place to place.

We will describe the mechanisms in the order of the operation there. Supported under the machine, by the bars 4, is a roll of card material 5, the end of which passes upwardly around a roller 6, provided at one end, Fig. 2, with a gear 7, which meshes with a gear 8, on a die roller 9, for printing the headings on the cards, above referred to. The die roller has provision for printing three horizontal rows of headings, as shown on the card, Fig. 8, although there is no heading in the third position on the card shown. The roller 6 over which the paper or card material 5 passes, is also provided at this end with a detent wheel 10, acted on by a retaining roller 11. The paper or card material 5, after passing around the roller 6, passes rearwardly over a supporting plate, 12, to the position of a knife 13, at which the end of the paper is cut off and falls into a container 14, as a card 15. The plate 12 forms a die at one place through which the punching pins, hereinafter referred to, pass in punching the holes through the card.

Referring now to the opposite side of the machine, Fig. 1, the roller 6, over which the paper runs is provided with a feed ratchet 16, adapted to be advanced by a pawl 17, carried by the pivoted arm 18, provided at its lower end with a cam roller 19, adapted to run on a cam member 20, when said cam member 20 and other parts mounted to move therewith, are moved forwardly in a manner hereinafter again referred to. The paper roller 6 is also provided at this end with an extension shaft $6^a$, provided with a thumb nut $6^b$ for turning the same by hand, when desired. Detachably supported under the die roller 9, is an ink roller 21, having a handle 22, with a through pin 23, adapted to fit into a bifurcated supporting member 24, pivoted at its outer end, and at its inner end drawn upwardly by means of a spring 25, whereby said ink roller 21 is held yieldingly up against the die roller 9. The die roller 9 is mounted in a bracket 26, pivoted at its upper end, as at 27, and yieldingly held to the paper roller 6 by means of a spring 28, on a plunger rod 29, working through the front of the supporting standard S.

We will next describe the carriage on the front of the machine and which travels across the machine, and comprises the key board, of 11 keys, as here shown, the type bars, and the connections whereby the type bars are operated when the keys are depressed. Mounted on the front of the base frame, at the opposite sides thereof, are supporting brackets or side plates, 30, 30, across the top of which is a top plate 31. Extending between said side plates is a main carrier bar 32. Upon this carrier bar 32, and the end bar 33, across the front end of the main frame, said carriage, indicated as a whole, 34, travels similar to the carriage of a typewriter. Referring to Fig. 4, there is shown one key of the carriage, with its connections for operating its type bar, also shown, and also the stop for determining the position of the selector bar, shown in fragmentary view, but not moving with the carriage mechanisms. When the key 35 is depressed, as shown in Fig. 4, it operates through a forked portion 35', to depress the type bar, 37 whereby the type 38 thereon strikes down on to the paper 5, moving thereunder. This connection to the type bar is by means of the spring 39, while a spring 40 returns the type bar to its rest position. Also carried by the forked portion 35', is a stop lip $35^a$, which is raised into position by the depressing of the key bar 35, so that it will catch and hold the selector bar 41, which is drawn rearwardly by a coiled spring 42, at its opposite end, Fig. 5. The depressing of the key bar 35 also operates through a rock bale 36, to raise a latch bar 44, pivotally mounted at one end, as at 45, to the under side of a cross bar 45'. The outer end of said latch bar 44 is provided with a laterally projecting lip $44^a$, adapted to catch in the notches $41^a$ in the selector bar 41. The latch bar 44 is yieldingly held down in engagement with the notches of the selector bar 41 by means of a spring 46. It will be understood, of course, that each of the keys of the traveling carriage has a corresponding set of mechanisms, as shown in Fig. 4 for key bar 35. The parts which travel with and are part of the combined carriage are the key bars 35, 35', the rack bar 36, type bars 37, and the connecting springs 39. The latch bars 44 are movably held in spaced relationship by a slotted cross plate, set edgewise, and designated 44ᶜ, said latch bars corresponding in number to the selector bars, 41. The carriage travels under the latch bars 44 and under the ends of the selector bars 41, as shown. Each of the selector bars 41, Fig. 6, near its rear end, is provided with laterally projecting lips or ledges, as 41', 41', extending along its upper and lower edges, and through which are slidably mounted plungers 47 and 48, plunger 47 being wide enough to depress two punch pins when depressed and plunger 48 being just wide enough to depress one punch pin when moved above said punch pins, hereinafter referred to. Said plungers 47 and 48 are yieldingly drawn to their raised positions by means of springs 49 and 50, and are provided at their lower ends with stop lugs 51 and 52. Said plungers move with their selector bars to different positions above the punch pins 53, and transversely thereof, as will be understood from Figs. 1 and 6.

With each depression of a key bar 35, an escapement is operated which permits the carriage to move one step across the front of the machine. This escapement is shown in dotted lines in Fig. 1 and comprises a rock bale 54, pivotally mounted on a shaft 55, extended across the front of the machine, below the key bars. This rock bale is common to all of the key bars so that when any key is depressed, said rock bale is also depressed. The carriage has attached thereto a tension tape on a spring-actuated spool for drawing it across the front of the machine. This is mounted on the side of the machine and is designated 56, Fig. 3. With each depression of the rock bale 54, the carriage is released to be moved one notch. Mounted on the carriage is a ratchet 57, on which operates a ratchet wheel 58, mounted on the upper end of a shaft 59, in a bracket bearing 60. On the lower end of said shaft 59 is an escapement wheel 61, controlled by an escapement arm 62, mounted on the shaft 55, and adapted to be rocked by the depression of the rock bale 54, to permit the escapement wheel 61 to turn one step. This escapement mechanism may be of any suitable type. The carriage is held and guided on the carrier bar 32 by four anti-friction rollers or wheels at each side of the carriage frame, as indicated in dotted lines at 63, Fig. 1, while the front of the carriage runs on the bar 33.

We have also provided a tabulating mechanism whereby the carriage can be tripped so as to be moved forwardly to different predetermined positions. Mounted on the top plate 31, at the left hand end thereof, is a key box 64, having keys 65, each mounted on a plunger bar 66, extended through the key box 64, as clearly indicated in Fig. 1. Within the key box, on the plunger bars 66, are springs 67 for normally holding said keys in their raised positions. Mounted under said key box is a depression plate 68. Said depression plate rests upon a pair of spaced elbow shaped rock plates 69, at each side of the carriage, and indicated in dotted lines, Fig. 1. The ratchet bar 57 is carried by the lower end of said elbow rock plates, also indicated in dotted lines in Fig. 1. Mounted at the further end of the carriage 34, is a stop plate 70, Fig. 2, adapted to catch on the lower ends of the plungers 66 of the keys depressed. This releases the carriage by moving the ratchet bar 57 out of mesh with the ratchet wheel 58 and allows the carriage to be drawn forwardly by the tension tape until the stop plate 70 engages the key bar 66 which has been depressed.

Inked ribbon spools 71, 71, are mounted at the opposite side of the machine and carry a ribbon across the machine, above the paper and below the position of the type bars 37, whereby the depression of a key operates a type bar and causes the type to be printed upon the paper, in a well known manner. The ribbon is moved from one spool to the other by any suitable ratchet feed, as indicated in a general way at 72, Fig. 1, the ratchet being operated by a link 73', connected to the rocker lever 73, whereby each time said rocker lever 73 is operated, the ribbon is stepped forward one notch.

From the foregoing it will be understood that as the keys 35 are depressed, the selector bars are released and permitted to be moved rearwardly until stopped by the stop lips 35ᵃ on the keys depressed. The selector bars are held in the stopped position by the latch bars 44. That is, they are first stopped by the stop lips 35ᵃ on the keys depressed and then held by the latch bars 44, which drop into the notches as the keys are released.

The selector bars carry the punch pin operating plungers 47 and 48, shown in Fig. 6, and these plungers stop over the punch pins 53 and in such position as to operate the proper pins to punch the cards to indicate the number printed by the corresponding type bar. This will be understood from the key shown in Fig. 9. The punch pins 53 are supported through spaced plates 74 and 75, and each has a collar 76 thereon, as indicated in Fig. 1. The lower plate 75 is connected at its opposite ends, by means of connecting rods 77, 77, with the top cross bar 78. Connected to the opposite outer ends of said cross bar 78 are operating rods 79, 79, connected at their lower ends to the rock levers 73, 73, whereby as said rock levers 73 are moved in a manner hereinafter described, said cross bar 78 is depressed and depresses all of the plungers 47 and 48, carried by the selector bars, which have been moved forwardly during the operation of the keys 35. This depression of said cross bar 78 and the plungers which have been moved to different positions over different punch pins, operates to depress the punch pins directly under the plungers. As the lower plate 75 moves downwardly with the cross bar 78, all of the punch pins are free to move down on to the paper thereunder, but only those depressed by the selected plungers, 47 and 48, are pushed through the paper to make the holes which correspond to the numbers which have been printed on the cards by the manipulation of the keys.

We will next describe the trip and connections to the motor for operating the cross bar 78, for punching the cards, for restoring the selector bars to their normal positions, for feeding the paper forwardly another step, and for intermittently operating the knife for cutting the card from the card material after it has been printed and punched.

The machine is intermittently, motor operated, a suitable motor being used to drive, through a suitable clutch mechanism 80, a crank 81, with which is connected a pitman 82, connected at its opposite end with a downwardly depending plate 83, secured to an operating bar 84, supported in depending hangers 85, 85, provided at their lower ends with bearing rollers 86, 86. Said operating bar 84 is provided at its rear end with a hanger 87, moving therewith and running at its upper end on the bar 3, as clearly shown in Figs. 5 and 6. The clutch mechanism, designated as a whole 80, can be of any suitable type, such for example, as that used in adding machines, and need not be here further described. A trip rod 88 extends from said clutch forwardly to the front of the machine where it is attached to the lower end of an arm 89, pivotally suspended at 90 and connected to be operated by means of a fork 91, engaged by the operating end of a trip lever or key 92, whereby when said trip lever or key 92 is depressed, it operates through the arm 89 and the rod 88 to trip the clutch 80, whereupon the crank 81 is given one turn, moving the operating bar 84 forwardly and back again. This carries the cam plate 83 and the pawls 98 and 109, hereinafter again referred to. This movement of the operating bar occurs each time the trip key 92 is depressed, assuming that the motor is running. As the operating bar moves forwardly, with the plate 83, to the position as indicated in Fig. 6, the upper edge of said plate 83 operates as a cam and rocks the rocker lever 73, which operates through the rods 79 to depress the cross bar 78, which operates the plungers for operating the selected punch pins, as hereinbefore described. The plate 83 is provided with an outwardly extending bar, 93, having a roller 94 on its end, supported in a bracket 95, Fig. 1. This rocker lever 73, also operates through the arm 73′ to feed the inked ribbon spools 71. The forward movement of said operating bar 84 also operates the cam 20, which operates the feed ratchet 16 for feeding the paper rearwardly one step.

Pivotally mounted in the base frame, in the rear of the selector bars, Fig. 5, is a restoring bale 96, having an operating dog 97, adapted to be engaged by a pawl 98, pivoted on the operating bar 84, whereby as said bar 84 is moved forwardly, said pawl 98 moves under the operating dog 97, to the position shown in Fig. 6, and upon its return movement, engages with the dog 97 and raises it, as shown in Fig. 5, thus operating to swing the bale 96 forwardly for the purpose of returning all of the selector bars 41 to their normal positions, in which positions they are held by latch bars 44, previously described. The restoring bale 96 is provided at one side of the machine with an operating hand crank 99, Fig. 3, whereby it is possible, in case of error by striking the wrong key, for the operator by simply depressing said crank 99, to restore all of the selector bars to their normal positions. The correct key or keys can then be manipulated before the trip key is touched.

Mounted through the machine, in the rear of the restoring bale, is a shaft 100, provided at one end with a disc 101, having four laterally projecting stop and operating pins 102. Also mounted on said shaft 100, at its end, is a cam arm 103, which operates as it turns around to engage and depress a bar 104, pivoted to a block 105, on the under side of the bar 3, Fig. 1, and the forward end of which bar 104 is connected with a vertical connecting link 106, for operating a knife 107, which has a shearing engagement with the edge of a plate 108, under which the end of the paper is fed. The shaft 100 is intermittently operated by the pivoted pawl 109, connected to the operating bar 84, as at 110, said pawl 109 having a pin engaging socket 109′ adapted to engage the operating pins 102, as said pawl returns from a forward movement, as will be clearly understood from Fig. 6. A holding pawl 111 is provided, having a head 112, which fits yieldingly between the pins 102, as shown in Fig. 1, for holding said disc and shaft from being turned rearwardly, while permitting it to be turned forwardly.

Thus it will be seen that as the shaft 100 is intermittently turned by the pawl 109 operating on the pins 102 of the disc 101, the cam arm 103, also secured to and turning with said shaft 100, is turned, and that four depressions of the operating key 92 is required to carry the cam arm 103 around one complete revolution and thus operate the cutting bar. In other words, every fourth move of the operating bar 84, which is operated by the key 92, turns the cam arm 103 down against the bar 104, which operates the cutter knife.

We will next describe the adding mechanism which carries forward the totals of items set up on the cards as they are made, referring to Figs. 7, 1 and 2. Mounted across the top of the machine, in suitable vertical supports 113, 113, are two series of counter wheels 114, 114, mounted on two shafts 116, and 117, provided on their outer ends with thumb buttons 118, 119, for hand manipulation in setting said counters back to neutral position. Said shafts have their supporting bearings in the side plates of the vertical supporting structure 113, 113, said bearings being open, whereby said counter shafts can be raised and lowered for a purpose hereinafter referred to. To this end said counter wheels and their shafts are mounted in pivoted arms at their opposite ends. Bearing shaft 116 is connected to the ends of the arms 120, 120, pivoted at their opposite ends to a shaft 121, while bearing shaft 117, is connected in the ends of the arms 122, 122, pivoted on shaft 123. The counter wheels of each set are provided with holding springs, as 124, mounted on suitable cross bars 125. These springs hold the counter wheels in proper register when they are out of mesh with the rack segments 126. Said counter wheels are mounted to be raised and lowered out of and into mesh with the rack segments 126, which are pivotally mounted at a space apart corresponding to the arrangement of the counter wheels, on a shaft 127, and the lower ends of said rack segments have connected therewith a series of springs 128, attached at their rear ends to a cross plate 129, Fig. 2, for drawing them rearwardly when released by the selector bars in the manner hereinafter again referred to. Referring to Fig. 7, it will be seen that the rear end of the selector bar 41 is shown in a moved position, also indicated in dotted lines in Fig. 2. Bearing against a lip 41$^c$ on the end of the selector bar is an elbow lever 130, yieldingly attached to the rack segment 126 by means of a spring 131. When the selector bar 41 is forward, in its normal position, the rack segment 26 is also in its neutral position, as indicated in Fig. 2. When a key 35 is depressed, a corresponding selector bar is released in a manner hereinbefore described, and is drawn to a predetermined position, determined by the stop 35$^a$, on the key depressed, Fig. 4. The rearward movement of the selector bar 41, permits its corresponding rack segment to be moved forwardly a corresponding distance for the purpose of operating the corresponding counter wheel. This forward movement of the rack segment is accomplished as follows: The elbow lever 130 is locked to the rack segment by a lever 132, Fig. 7, pivoted between two studs 133, 133, on the side of the rack segment 126, and moving in a plane transversely of the plane of the rack segment. The lower end of said elbow lever 132 is provided with a shoulder 134, which normally rests against the upper edge of the elbow lever 130, as indicated in the dotted line position, Fig. 1, shown released in Fig. 7. When this lever 132 is in engagement with the elbow lever 130, as it is when in normal position, and a selector bar 41 is released and moves rearwardly, as shown in Fig. 7, said elbow lever 130 and the rack segment 126, are moved together by the spring 128, operating on the lower end of the rack segment, indicated in dotted lines in Fig. 7. Thus the rack segment is permitted to move forwardly a distance corresponding to the position the selector bar is moved, the rack segment operating its counter wheel accordingly. The rack segment 126 and the elbow lever 130 thus move together according to the distance the selector bar 41 has been moved. When the lever 132, mounted on the side of the rack segment, is tripped in a manner hereinafter described, the rack segment is then drawn forwardly a distance corresponding to one notch, or until the stud 135, also on the side of the rack segment, engages the end of the elbow lever 130, as it has done in Fig. 7. In other words, there is a relative movement between the rack segment 126 and the elbow lever 130 for the distance of one notch of the rack segment. In one instance the rack segment 126 and the elbow lever 130 are held together by the spring 131, positioned relative to each other by the lever 132. In the other instance the rack segment and the elbow lever 130 are held together by the spring 131, but are positioned relative to each other by the stud 135. The tripping of the lever 132 permits the rack segment 126 to move forwardly another notch and this takes place to permit a transfer from one counter wheel to the other. Each of the counter wheels is provided with a pin 136, which projects laterally therefrom, in a position to engage a rock and trip member 137, pivotally mounted, as at 138, between two cross plates 139—139'. The lower end of said trip bar is Y-shaped, as at 137$^a$, whereby it will engage the upper end of the lever 132, carried by the rack segment 126, no matter to what position said rack segment and the lever 132 has been moved. The upper end of said trip lever 137 is engaged by the pin 136 on the adjacent counter wheel 114 for the purpose of tripping said trip lever 137 and the lever 132, for the purpose of allowing the adjacent rack segment to be carried forward one notch in making a transfer. This mechanism will be readily understood, as it is not new but forms a co-operating element in the present combination.

The counter wheels are intermittently let down into mesh with the rack segments. This action takes place just prior to the forward movement of said rack segments, and they are raised prior to the return of the rack segments to their normal positions. This action is necessary to a proper operation of the counter wheels, as will be readily understood.

We will now describe the connections by means of which these counter wheels and their carrying shafts are raised and lowered. Mounted on the shaft which carries the paper feed roller 6, is a cam disc 140, having two cam points 140', Fig. 2, which engage and move the ends of two rocker levers 141 and 142, shown separated in Fig. 7 for purposes of clearness, although these levers are mounted on the same shaft, 143. The inner ends of said levers 141 and 142 are connected with two vertical links 143ᵃ and 144, normally lifted by the springs 145. Their upper ends are connected, respectively, with levers 146 and 147, which are connected with and operate holding pawls 148 and 149. Pawl 148 is adapted to underlie and hold the arm 122 and its counter wheels in a raised position and out of mesh with the rack segments, as shown in Fig. 7. Pawl 149 is adapted to underlie and hold the arm 120 and its counter wheels out of mesh with said rack segments, as shown. These pawls are moved out of supporting positions by the cam points 140' and their connections. On the vertical link 143ᵃ, Fig. 7, is a stud 143', adapted as said link is drawn downwardly, to engage an arm 150, which is connected with and moves a latch bar 151, adapted to hook and hold a restoring bale 152, which extends across and in front of the rack segments, and is raised for the purpose of restoring all of said rack segments to their normal positions. This bale is shown in its raised position in dotted lines, Fig. 2. Said restoring bale is mounted at its opposite ends on a shaft 127, to which is connected an arm 153, connected by a link 154, to a bell crank 155, pivoted at 156, and the other arm 155' of which is provided with a cam roller 157, which operates on a cam disc 158, having two cam points 158', 158', as clearly seen in Fig. 7. Also mounted on shaft 100, is a second cam disc 159, having two cam extensions 159', 159', which engage and lift the lower end of a bar 160, the upper end of which is attached to the pivoted arm 161, the middle portion of which is arranged to engage a pin 162, on the arm 122, for lifting the counter wheels 115 out of mesh with the rack segments. The underside of the lever 120 is engaged and lifted by the outer end of the lever 161, thus lifting the counter wheels 114 out of mesh with the segments 126.

In order to control the movement of the rack segments which operate the counter wheels, an air dash pot 164 is provided, having a piston and piston rod, 165, connected by means of a link 166, to the bell crank 155. The movement of said bell crank 155 rearwardly is caused by a spring 167, attached at its rear end to a cross piece 168, to which are also attached the springs 42 which draw the selector bars 41 rearwardly when they are released by the manipulation of the keys. Movably mounted through the outer end of the dash pot 164 is a valve pin 169, having a reduced portion, as indicated in dotted lines, whereby when said pin is moved outwardly by the piston, the air in the dash pot is permitted to escape around the reduced portion of said pin. Said valve pin 169 is returned with the piston by means of a pivoted arm 170, drawn inwardly by a spring 171, attached to the anchor pin 172.

Thus we have provided a combination of co-operating elements for automatically making, printing, punching and discharging record cards, with means for accumulating totals of certain of the information indicated on said cards. These co-operating elements or mechanisms may be briefly stated as follows: paper or card material feeding mechanism; key-controlled printing and punching mechanism; selector mechanism for determining the positions of the record punches; counter mechanism; motor-actuated means for automatically operating the paper feed, the punching mechanism, the adding mechanism, and for restoring the selecting and punching mechanism. In other words, as the paper is fed rearwardly each step between the die and the feed roller, the different headings and divisions are printed for the first horizontal row of information. The manipulation of the keys prints the information under said headings, the carriage advancing across the machine during the printing information. The manipulation of the keys also selects and sets the means for operating the punch pins. The trip key throws in the clutch for the motor actuation of the machine, assuming that the motor is running. The actuation feeds the end of the paper or card material one step from the position at which it has been printed by the manipulation of the keys, then depresses the punch bar to make the record punches corresponding to the key-printed matter, cuts off the card, and restores the punching mechanism to normal position. As the paper is fed another step the die prints the second line of headings across the card. The keys are again manipulated for printing the desired information, here indicated by numbers, and the trip key is again depressed. The counter mechanism is operated, according to the machine here shown and described, only for a part of the information on the card shown in Fig. 8; that is, a part of the information on the second horizontal row and that in the lower horizontal row is carried forward in the totals, as desired. The cards are thus made, printed, punched and discharged, automatically, under the control of a key board and trip key. The mechanisms, as hereinbefore described, are interconnected and depend upon each other in their operation for automatically performing the described function.

While we have shown and described one practical embodiment of our invention for purposes of illustration, we are aware that many changes can be made in the details thereof without departing from the spirit of the invention, and we do not, therefore, limit the invention to this showing except as we may be limited by the hereto appended claims.

We claim:

1. In a card making machine, in combination, means for feeding card material thereto in long strip form, means for automatically printing headings thereon, key-controlled means for printing data thereon under said headings, and means for punching record holes through said card material under said headings.

2. In a card making machine, in combination, means for feeding card material thereto in long strip form, means for automatically printing headings thereon, key-controlled means for printing data thereon under said headings, means for punching record holes through said card material under said headings, said means being selectively controlled by said key-controlled printing means, and separate means for actuating said punching means.

3. In a card making machine, in combination, means for feeding long strips of card material thereto, means for automatically printing headings thereon, key-selected punching means for punching record holes through said card material under said headings, and separate means for actuating said punching means.

4. In a card making machine, in combination, means for feeding long strips of card material thereto, means for automatically printing headings thereon, means for printing data thereon under said headings, means for punching record holes through said card material under said headings, keys for operating said printing means and for selectively setting said punching means, and separate means for actuating said punching means.

5. In a card making machine, in combination, means for feeding long strips of card material thereto, means for automatically printing data thereon, means for punching record holes therethrough, means for controlling said printing and punching means, whereby the same data is indicated by print and punch on and through said card, and means for discharging said card.

6. In a card making machine, in combination, means for feeding long strips of card material thereto, means for automatically printing data thereon, means for punching record holes therethrough, said record holes corresponding to said printed data, and means for cutting said card from said card material.

7. In a card making machine, in combination, means for feeding long strips of card material thereto, means for printing headings thereon as said card material advances in said machine, key controlled means for printing data thereon under said headings, key controlled means for punching record holes therethrough under said headings, said record holes indicating the same data as printed under said headings, and means for cutting said card from said card material and delivering it from said machine.

8. In a card making machine, in combination, means for feeding card material in strips thereto, means for printing data thereon, means for punching record holes therethrough to indicate the same data, said printing means and punching means being selectively and simultaneously controlled from a key board, and a key-board for determining the data to be indicated by print and punch.

9. In a card making machine, in combination, means for feeding card material in strips thereto, automatic means for printing headings thereon as said card material advances in said machine, key-controlled printing means for printing data thereon under said headings, means for punching record holes therethrough to indicate the same data, said punching means being selectively controlled by said key-controlled printing means, and key controlled means for automatically cutting said card from said card material.

10. In a card making machine, in combination, means for feeding card material thereto, a die for automatically printing headings thereon as it passes therethrough, key-controlled printing means for printing data under said headings, punching means for punching record holes therethrough to indicate the same data, means for selectively setting said punching means, and means for simultaneously operating said punching means when selectively set.

11. In a card making machine, in combination, means for feeding card material thereto, a die for printing headings thereon, printing means for printing data thereon under said headings, a key board for manipulating said printing means, means for punching record holes through said card material under said headings to thus indicate the same data, said punching means being selectively controlled from said key board, separate key-controlled means for automatically operating said punching means, and means for delivering the finished card.

12. In a card making machine, in combination, means for feeding card material thereto, means for printing headings thereon, key-controlled means for printing data thereon under said headings, means simultaneously controlled by said keys for punching record holes through said card material under said headings to indicate the same data, and adding mechanism with operating connections for totaling certain of said data so indicated on said card.

13. In a card making machine, in combination, means for feeding card material thereto, means for printing headings thereon as said card material advances in said machine, means for printing data under said headings, keys for actuating said printing means, means for punching record holes through said card material, said punching means being selectively and simultaneously controlled from said keys, adding mechanism for totaling data indicated by record print and punch under said headings, and means for actuating the punching means and the adding mechanism, substantially as described.

14. In a card making machine, in combination, means for feeding card material in strip form thereto, means for printing data thereon, means for punching record holes therethrough, means for controlling said printing and punching means, whereby the same data is indicated by print and punch on and through said card, adding mechanism for totaling data indicated on said card, keys for simultaneously operating the printing means and for selectively setting the punching means, and key-controlled means for automatically operating the punching means and the adding mechanism, substantially as described.

15. In a card making machine, in combination, means for feeding card material thereto automatically, means for automatically printing headings thereon as said material advances in said machine, key operated printing means for printing data on said card material under said headings, punching pins for punching holes through said card material, key-controlled selective mechanism for selectively positioning said pins, and means for simultaneously operating the selected pins for punching record holes through said card.

16. In a card making machine, in combination, means for feeding card material thereto automatically, means for automatically printing headings thereon as said material advances in said machine, key operated printing means for printing data on said card material under said headings, punching pins for punching holes through said card material, key-controlled selective mechanism for selectively positioning said pins, means for simultaneously operating said pins for punching record holes through said card, adding mechanism, and operating connections whereby data indicated on said card by print and record holes is totaled on said adding mechanism.

17. In a card making machine, in combination, means for printing data on said card, means for punching holes through said card to indicate the printed data, adding mechanism for totaling data indicated on said card by print and holes, means for selectively positioning said punching means during the printing operation, and means for operating the punching means and the adding mechanism, substantially as described.

18. An automatic card making machine comprising in combination, means for holding and feeding long strips of card material in position, key actuated printing means for printing data thereon, punch pins adapted to be positioned to punch record holes therethrough to correspond with said printed data, means for automatically positioning said punch pins selectively during the manipulation of said keys, means for operating said punch pins to make record holes indicative of the printed data, and means for cutting said card material into cards, substantially as described.

19. An automatic card making machine comprising in combination means for feeding long strips of card material thereto, means for printing data on said card material, means for simultaneously indicating the same data on said card material by record punches, means for adding data so indicated on said card material, and adding mechanism with operating connections for totaling data indicated on said card material by print and punch, and means for cutting the card from said card material, substantially as described.

20. An automatic card making machine comprising in combination, means for feeding long strips of card material into said machine, a traveling carriage having key-operated type bars for printing data on said card material as said carriage advances across said machine, means for moving said carriage, controlled by said keys, punch pins adapted to be selectively positioned to punch record holes through said card material, means for automatically and selectively positioning said punch pins during the operation of said keys, adding mechanism for totaling data indicated on said card, and means for automatically operating said punch pins, adding mechanism and for cutting said cards from said card material, substantially as described.

21. An automatic card making machine comprising in combination, means for feeding long strips of card material to said machine, means for printing headings thereon as it advances in said machine, key operated printing means for printing data under said headings, punch pins for punching record holes through said card material to indicate said data, key controlled means for selectively positioning said punch pins, means for operating said punch pins for punching the holes, means for restoring said punch pins to their normal positions, adding mechanism for totaling data so indicated on said card material, and power means for operating said feeding, punching, and restoring means, substantially as described.

Signed at Portland, Multnomah County, Oregon, this 5th day of June, 1918.

ARTHUR S. TREW.
FRANK A. BULLINGTON.

In presence of—
A. G. BROWN,
W. R. LITZENBERG.